(12) United States Patent
Kachmar

(10) Patent No.: US 9,316,802 B2
(45) Date of Patent: Apr. 19, 2016

(54) OPTICAL FIBER CABLE HAVING REINFORCING LAYER OF TAPE HEAT-BONDED TO JACKET

(71) Applicant: ADC Telecommunications, Inc., Berwyn, PA (US)

(72) Inventor: Wayne M. Kachmar, North Bennington, VT (US)

(73) Assignee: CommScope Technologies LLC, Hickory, NC (US)

( * ) Notice: Subject to any disclaimer, the term of this patent is extended or adjusted under 35 U.S.C. 154(b) by 141 days.

(21) Appl. No.: 13/974,830

(22) Filed: Aug. 23, 2013

(65) Prior Publication Data

US 2014/0064669 A1   Mar. 6, 2014

Related U.S. Application Data

(60) Provisional application No. 61/693,051, filed on Aug. 24, 2012.

(51) Int. Cl.
  *G02B 6/36* (2006.01)
  *G02B 6/44* (2006.01)
  *G02B 6/38* (2006.01)

(52) U.S. Cl.
  CPC .............. *G02B 6/443* (2013.01); *G02B 6/381* (2013.01); *G02B 6/3887* (2013.01); *G02B 6/4486* (2013.01); *Y10T 29/49826* (2015.01); *Y10T 156/10* (2015.01); *Y10T 156/1052* (2015.01)

(58) Field of Classification Search
  USPC .......................................................... 385/78
  See application file for complete search history.

(56) References Cited

U.S. PATENT DOCUMENTS

| | | |
|---|---|---|
| 3,873,389 A | 3/1975 | Daniels |
| 3,903,354 A | 9/1975 | Dageförde |
| 3,991,014 A | 11/1976 | Kleinschuster |
| 4,067,852 A | 1/1978 | Calundann |
| 4,083,829 A | 4/1978 | Calundann et al. |
| 4,089,585 A | 5/1978 | Slaughter et al. |
| 4,130,545 A | 12/1978 | Calundann |
| 4,161,470 A | 7/1979 | Calundann |
| 4,199,225 A | 4/1980 | Slaughter et al. |

(Continued)

FOREIGN PATENT DOCUMENTS

| | | |
|---|---|---|
| CN | 2667513 Y | 12/2004 |
| CN | 2722273 Y | 8/2005 |

(Continued)

OTHER PUBLICATIONS

Teijin Endumax, Endumax tape, 1 page, (Applicants admit as prior art as of priority date of application).

(Continued)

*Primary Examiner* — Sung Pak
(74) *Attorney, Agent, or Firm* — Merchant & Gould P.C.

(57) ABSTRACT

An optical fiber cable includes an optical fiber; a sheet of reinforcing tape rolled around a majority of an annular sidewall of the optical fiber; and a jacket surrounding the rolled sheet of reinforcing tape. The sheet has parallel longitudinal edges that are circumferentially spaced from each other to form a longitudinal slit along a length of the sheet of reinforcing tape. The reinforcing tape is formed of a polymeric material having uni-directionally oriented molecules along the length of the sheet. The jacket is heat-bonded to the sheet of reinforcing tape.

15 Claims, 4 Drawing Sheets

(56) References Cited

U.S. PATENT DOCUMENTS

| | | | |
|---|---|---|---|
| 4,241,979 A * | 12/1980 | Gagen et al. | 385/107 |
| 4,304,462 A | 12/1981 | Baba et al. | |
| 4,318,842 A | 3/1982 | East et al. | |
| 4,349,243 A * | 9/1982 | Amano et al. | 385/109 |
| 4,359,598 A | 11/1982 | Dey et al. | |
| 4,458,388 A | 7/1984 | Farago et al. | |
| 4,468,364 A | 8/1984 | Ide | |
| 4,515,435 A | 5/1985 | Anderson | |
| 4,557,560 A | 12/1985 | Bohannon, Jr. et al. | |
| 4,569,420 A | 2/1986 | Pickett et al. | |
| 4,595,793 A | 6/1986 | Arroyo et al. | |
| 4,626,306 A | 12/1986 | Chabrier et al. | |
| 4,644,098 A | 2/1987 | Norris et al. | |
| 4,659,174 A | 4/1987 | Ditscheid et al. | |
| 4,661,406 A | 4/1987 | Gruhn et al. | |
| 4,710,594 A | 12/1987 | Walling et al. | |
| 4,729,628 A | 3/1988 | Kraft et al. | |
| 4,730,894 A | 3/1988 | Arroyo | |
| 4,761,053 A | 8/1988 | Cogelia et al. | |
| 4,807,962 A | 2/1989 | Arroyo et al. | |
| 4,810,834 A | 3/1989 | Grögl et al. | |
| 4,818,060 A | 4/1989 | Arroyo | |
| 4,844,575 A | 7/1989 | Kinard et al. | |
| 4,852,965 A | 8/1989 | Mullin et al. | |
| 4,852,966 A | 8/1989 | Kimmich et al. | |
| 4,895,427 A | 1/1990 | Kraft | |
| 4,909,592 A | 3/1990 | Arroyo et al. | |
| 5,015,063 A | 5/1991 | Panuska et al. | |
| 5,125,063 A | 6/1992 | Panuska et al. | |
| 5,131,064 A | 7/1992 | Arroyo et al. | |
| 5,157,752 A | 10/1992 | Greveling et al. | |
| 5,214,730 A | 5/1993 | Nagasawa et al. | |
| 5,229,851 A | 7/1993 | Rahman | |
| 5,253,318 A | 10/1993 | Sayegh et al. | |
| 5,345,525 A | 9/1994 | Holman et al. | |
| 5,345,526 A | 9/1994 | Blew | |
| 5,503,928 A | 4/1996 | Cheshire | |
| 5,557,698 A | 9/1996 | Gareis et al. | |
| 5,573,857 A | 11/1996 | Auger | |
| 5,593,524 A | 1/1997 | Philips | |
| 5,627,932 A | 5/1997 | Kiel et al. | |
| 5,642,452 A | 6/1997 | Gravely et al. | |
| 5,656,796 A | 8/1997 | Marinos et al. | |
| 5,737,470 A | 4/1998 | Nagano et al. | |
| 5,838,864 A | 11/1998 | Patel et al. | |
| 5,925,461 A | 7/1999 | Fairgrieve | |
| 5,970,196 A | 10/1999 | Greveling et al. | |
| 5,978,536 A | 11/1999 | Brandi et al. | |
| 5,982,966 A | 11/1999 | Bonicel | |
| 6,014,487 A | 1/2000 | Field et al. | |
| 6,088,499 A | 7/2000 | Newton et al. | |
| 6,137,936 A | 10/2000 | Fitz et al. | |
| 6,236,790 B1 * | 5/2001 | Okada et al. | 385/102 |
| 6,249,628 B1 | 6/2001 | Rutterman et al. | |
| 6,256,438 B1 | 7/2001 | Gimblet | |
| 6,270,851 B1 | 8/2001 | Lee et al. | |
| 6,284,367 B1 | 9/2001 | Gruhn et al. | |
| 6,321,012 B1 | 11/2001 | Shen | |
| 6,347,172 B1 | 2/2002 | Keller et al. | |
| 6,348,236 B1 | 2/2002 | Fairgrieve et al. | |
| 6,356,690 B1 | 3/2002 | McAlpine et al. | |
| 6,370,303 B1 | 4/2002 | Fitz et al. | |
| 6,493,491 B1 | 12/2002 | Shen et al. | |
| 6,496,627 B1 | 12/2002 | Tuminaro | |
| 6,542,674 B1 | 4/2003 | Gimblet | |
| 6,621,964 B2 | 9/2003 | Quinn et al. | |
| 6,654,527 B2 | 11/2003 | Sakabe et al. | |
| 6,701,047 B1 | 3/2004 | Rutterman et al. | |
| 6,744,954 B1 | 6/2004 | Tanaka et al. | |
| 6,807,347 B2 | 10/2004 | McAlpine et al. | |
| 6,813,422 B1 | 11/2004 | Krishnamurthy et al. | |
| 6,836,603 B1 | 12/2004 | Bocanegra et al. | |
| 6,894,218 B2 | 5/2005 | Kohn et al. | |
| 6,897,382 B2 | 5/2005 | Hager et al. | |
| 6,899,776 B2 | 5/2005 | Bahlmann et al. | |
| 6,901,191 B2 | 5/2005 | Hurley et al. | |
| 6,937,801 B2 | 8/2005 | McAlpine et al. | |
| 7,006,740 B1 | 2/2006 | Parris | |
| 7,113,680 B2 | 9/2006 | Hurley et al. | |
| 7,218,821 B2 | 5/2007 | Bocanegra et al. | |
| 7,227,084 B2 | 6/2007 | Bates et al. | |
| 7,244,337 B2 | 7/2007 | Bahlmann et al. | |
| 7,349,607 B2 * | 3/2008 | Schneider et al. | 385/102 |
| 7,349,642 B2 | 3/2008 | Tatematsu et al. | |
| 7,433,566 B2 | 10/2008 | Bookbinder et al. | |
| 7,458,103 B2 | 12/2008 | Citterio et al. | |
| 7,758,257 B2 * | 7/2010 | Anderson et al. | 385/87 |
| 8,031,996 B2 | 10/2011 | Willemsen et al. | |
| 8,041,166 B2 | 10/2011 | Kachmar | |
| 8,290,320 B2 | 10/2012 | Kachmar | |
| 8,548,293 B2 | 10/2013 | Kachmar | |
| 2002/0025127 A1 | 2/2002 | Graham et al. | |
| 2006/0105169 A1 | 5/2006 | Greer, IV | |
| 2006/0137156 A1 | 6/2006 | Kawabe et al. | |
| 2006/0159407 A1 | 7/2006 | Kachmar | |
| 2006/0280413 A1 | 12/2006 | Paschal et al. | |
| 2006/0291787 A1 | 12/2006 | Seddon | |
| 2007/0127878 A1 | 6/2007 | de Montmorillon et al. | |
| 2007/0189699 A1 | 8/2007 | Matsuo et al. | |
| 2007/0280615 A1 | 12/2007 | de Montmorillon et al. | |
| 2008/0118209 A1 * | 5/2008 | Varkey et al. | 385/101 |
| 2008/0187276 A1 | 8/2008 | Roberts et al. | |
| 2009/0317039 A1 | 12/2009 | Blazer et al. | |
| 2010/0266247 A1 | 10/2010 | Willemsen et al. | |
| 2010/0322573 A1 | 12/2010 | Yasutomi et al. | |
| 2011/0124835 A1 | 5/2011 | De Weijer et al. | |
| 2011/0280521 A1 * | 11/2011 | Kachmar | 385/78 |
| 2012/0230637 A1 | 9/2012 | Kachmar | |
| 2013/0202260 A1 | 8/2013 | Kachmar | |
| 2014/0016904 A1 | 1/2014 | Kachmar | |

FOREIGN PATENT DOCUMENTS

| | | |
|---|---|---|
| EP | 316922 | 11/1988 |
| EP | 569928 | 5/1993 |
| EP | 0837162 | 4/1998 |
| GB | 1433128 | 8/1972 |
| GB | 1 483 845 | 8/1977 |
| GB | 2 096 343 A | 10/1982 |
| GB | 2 296 575 A | 7/1996 |
| JP | 57-186708 | 11/1982 |
| JP | 10-130996 | 5/1998 |
| JP | 2001-166188 | 6/2001 |
| JP | 2001-208942 | 8/2001 |
| JP | 2001-337255 | 12/2001 |
| JP | 2003-300744 | 10/2003 |
| JP | 2006-313314 | 11/2006 |
| KR | 2000-0046917 | 7/2000 |
| KR | 10-2006-0107414 | 10/2006 |
| WO | WO 03/091006 | 11/2003 |
| WO | WO 2004/090628 | 10/2004 |
| WO | WO 2009-068541 | 6/2009 |

OTHER PUBLICATIONS

ADC Spec Sheet, Fiber Optic Cable, Ruggedized Simplex and Duplex Cables, ADC®, 4 pages (Oct. 2005).

ADC Spec Sheet, Fiber Optic Cable, Tactical Cables, ADC®, 4 pages (Oct. 2005).

Description of Fiber Optic Cable—LCF Microcable: Plenum, 6 pages (Aug. 2005).

Fiber Optic Cable LCF Microcable: Plenum, *ADC Telecommunications, Inc.*, 4 pages (Aug. 2005).

Superior Essex, FTTP Tight Buffered Indoor/Outdoor Drop, Series W7, RoHS, Product Bulletin, OSP Fiber Products, 2 pages (Nov. 2008).

Teijin, Making the Zetta World Possible, 2 pages (Oct. 2009).

Twaron—a Versatile High-Performance Fiber, Teijin, 7 pages (2012).

* cited by examiner

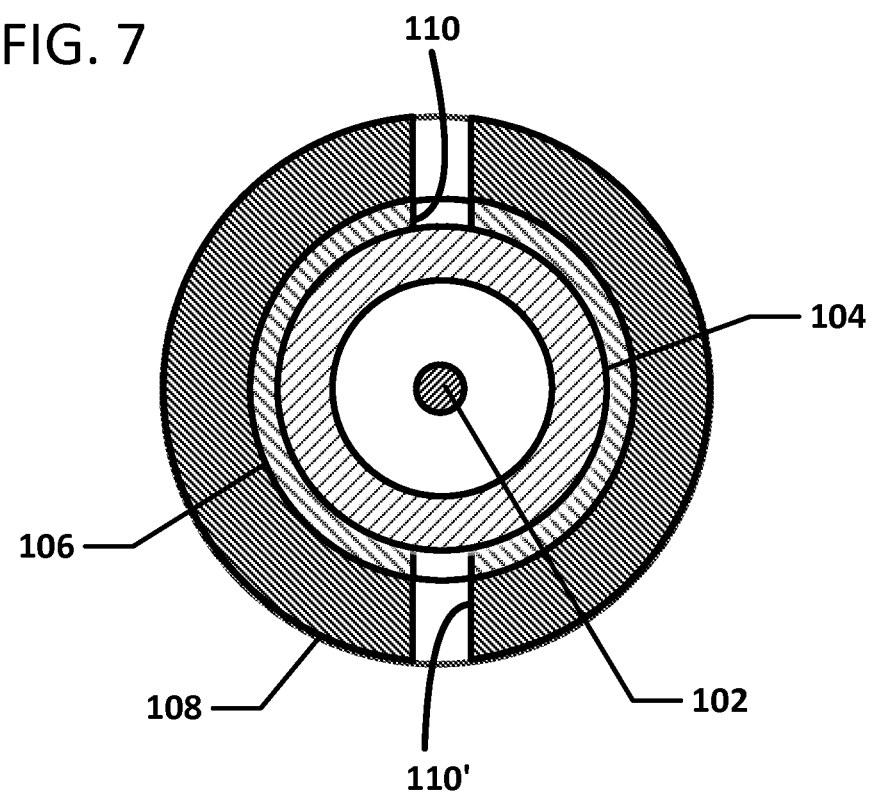

OPTICAL FIBER CABLE HAVING REINFORCING LAYER OF TAPE HEAT-BONDED TO JACKET

CROSS-REFERENCE TO RELATED APPLICATION

The present patent application claims the benefit of U.S. Provisional Patent Application Ser. No. 61/693,051, filed Aug. 24, 2012, which application is hereby incorporated by reference in its entirety.

BACKGROUND

A fiber optic cable typically includes: (1) an optical fiber; (2) a buffer layer that surrounds the optical fiber; (3) a plurality of strength members loosely surrounding the buffer layer; and (4) an outer jacket. Optical fibers function to carry optical signals. A typical optical fiber includes an inner core surrounded by a cladding that is protected by a coating. The buffer layer functions to surround and protect the coated optical fibers. Strength members add mechanical strength to fiber optic cables to protect the internal optical fibers against stresses applied to the cables during installation and thereafter. Outer jackets also provide protection against chemical damages.

The use of strength members that loosely surround the optical fiber can create difficulties in manufacturing and/or installing fiber optic cables as these loosely situated strength members can be difficult to cut and difficult to use in automated manufacturing processes.

SUMMARY

An aspect of the disclosure includes an optical fiber cable including an optical fiber defining an annular sidewall; a sheet of reinforcing tape rolled around a majority of the annular sidewall of the optical fiber, and a jacket surrounding the rolled sheet of reinforcing tape. The jacket is heat-bonded to the sheet of reinforcing tape. The reinforcing tape is formed of a polymeric material.

In certain implementations, the polymeric material has uni-directionally oriented molecules along the length of the sheet. In certain implementations, the tape does not include any reinforcement fibers or yarns.

Another aspect of the disclosure includes an optical fiber cable including an optical fiber; a sheet of reinforcing tape rolled around the optical fiber; and a jacket surrounding the rolled sheet of reinforcing tape. The reinforcing tape is formed of a polymeric material having uni-directionally oriented molecules along the length of the sheet of reinforcing tape.

Another aspect of the disclosure includes a method of manufacturing an optical fiber cable including wrapping a sheet of reinforcing tape around the first optical fiber so that longitudinal edges of the sheet extend parallel to each other along a length of the first optical fiber to form a rolled sheet of reinforcing tape; and extruding a jacket around the rolled sheet of reinforcing tape so that heat from extrusion partially melts the reinforcing tape to heat-bond the rolled sheet of reinforcing tape to the jacket. The reinforcing tape includes polyethylene molecules uni-directionally oriented along the length of the sheet.

Another aspect of the disclosure includes a method of connectorizing a first axial end of an optical cable including a jacket surrounding reinforcing tape wrapped around an optical fiber. The method includes spreading out reinforcing tape at the first axial end of the optical cable to provide an enlarged cross-dimension of the first axial end; axially sliding a portion of an optical connector rearwardly into the first axial end of the optical cable through the enlarged cross-dimension; and applying heat to the first axial end of the optical cable to heat-bond the first axial end of the optical cable to the portion of the optical connector.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 7 is a transverse cross-sectional view of another example optical fiber cable including a reinforcing jacket defining two slits.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

The disclosure is directed to an optical fiber cable including a high strength polymer tape. The tape is formed from uni-directionally oriented polymeric molecules. The optical fiber cable does not include strength yarns (e.g., aramid yarns, glass fibers, propylene fibers, etc.). Rather, the tape provides tensile strength to the cable. In certain implementations, the tape is bonded (e.g., thermally bonded) to the jacket so that the tape and the jacket are no longer separate elements. Also, the tape does not include any reinforcement yarns or fibers, such as aramid, fiberglass, or propylene.

Figure 1:
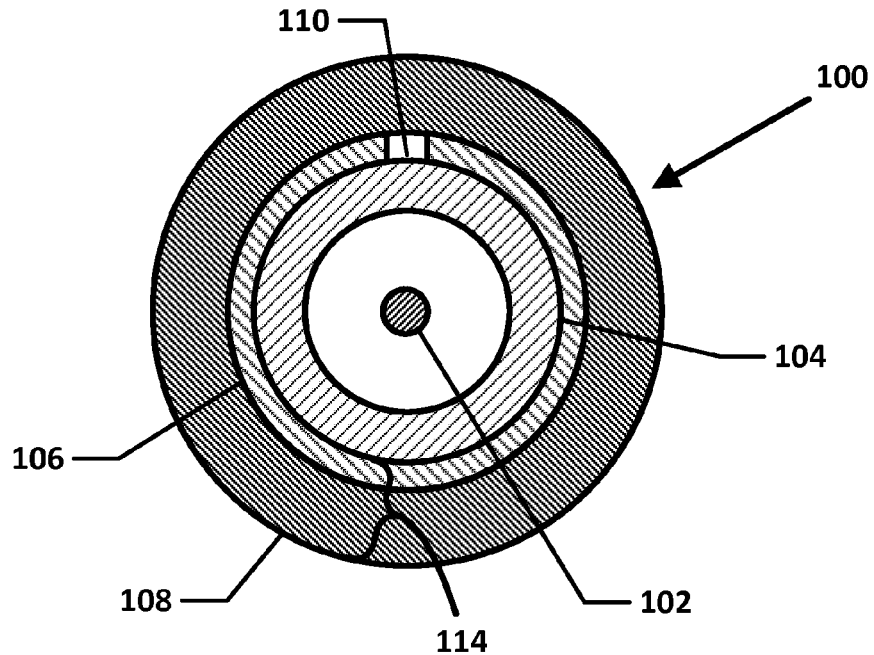
FIG. 1 is a transverse cross-sectional view of an example optical fiber cable including an optical fiber, a buffer, a sheet of tape, and a jacket.

FIG. 1 is a transverse cross-sectional view of one example optical fiber cable 100 including one or more optical fibers 102, a buffer 104 surrounding the optical fiber 102, at least one layer of tape 106, and a jacket 108. In some implementations, buffer 104 forms a "tight buffer" around the optical fiber. In other implementations, the buffer 104 forms a "loose tight buffer" around the optical fiber. In one example implementation, the buffer 104 has an outer diameter of about 900 nm. In other implementations, the buffer 104 has a larger or smaller outer diameter.

Figure 2:
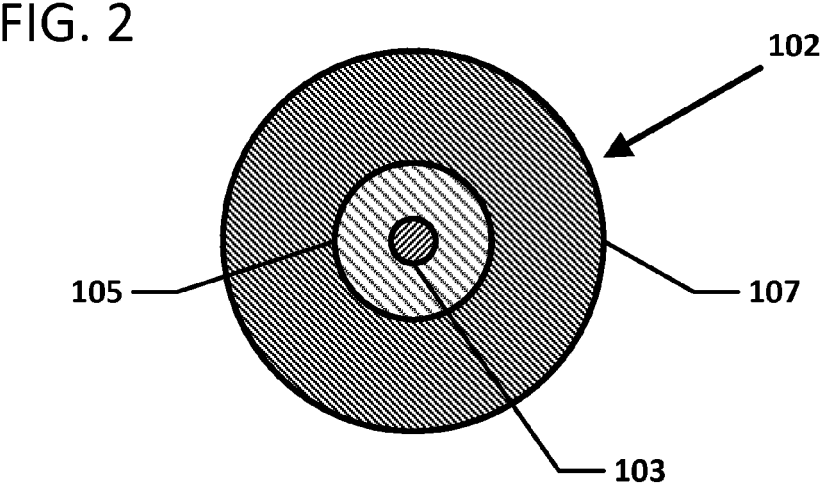
FIG. 2 is a transverse cross-sectional view of an example optical fiber suitable for use in the optical fiber cable of FIG. 1.

As shown in FIG. 2, each of the optical fibers can be formed from a core 103, a cladding 105 surrounding the core 103, and a coating 107 around the cladding 105. In some implementations, the core 103 has a diameter of about 10 nm; the cladding 105 has a diameter of about 125 nm; and the coating has a diameter of about 240 nm-260 nm. In other implementations, the cladding 105 and/or coating 107 can be thicker or thinner.

The tape 106 is formed from a polymeric material. Molecules of the polymeric material are oriented in a common direction (i.e., uni-directionally oriented). In certain implementations, the molecules are oriented along a longitudinal axis of the cable 100. In some implementations, the uni-directionally oriented molecules include polyethylene molecules. In one example implementation, the tape 106 includes Endumax® tape produced by Teijin Aramid B.V in Arnhem, NL. In other implementations, other types of polymeric molecules can be used in the tape 106. Details regarding one example suitable tape are disclosed in U.S. Publication No. 2011-0124835, the disclosure of which is hereby incorporated herein by reference.

Figure 3:
FIG. 3 is a top plan view of a sheet of tape wrapped around an optical fiber, the sheet of tape having circumferentially spaced longitudinal edges to form a gap.

The layer of tape 106 is formed by rolling a sheet of tape 106 around the buffered optical fiber so that opposite longitudinal edges 109, 111 of the sheet are disposed adjacent to each other (see FIG. 3). In certain implementations, the sheet of reinforcing tape 106 is rolled around at least a majority of a circumference of the buffered optical fiber. In some implementations, the opposite edges 109, 111 of the sheet of tape 106 overlap each other to form a roll of tape 106.

In other implementations, the opposite edges 109, 111 are spaced circumferentially from each other without overlapping (see FIG. 3). In certain implementations, the opposite edges 109, 111 are parallel to each other. The spaced edges 109, 111 form a longitudinal gap or slit 110 leading from an exterior surface of the tape 106 to an exterior surface of the buffer 104. In some implementations, the longitudinal slit 110 extends along a length of the sheet of reinforcing tape 106. In other implementations, the longitudinal slit 110 extends along only part of the length of the sheet of reinforcing tape 106.

The jacket 108 is extruded around the layer of tape 106 during a jacket extrusion process. In some implementations, the jacket 108 is formed from PVC. In other implementations, the jacket 108 is formed from a Low Smoke Zero Halogen material. In certain implementations, the optical fiber cable 100 is plenum rated. In certain implementations, the optical fiber cable 100 is riser rated. The jacket 108 has a higher melt point than the tape 106. The heat emitted by the extruded jacket material at least partially melts the tape 106 when the jacket 108 contacts the tape 106. Accordingly, the jacket 108 is bonded to the tape 106 during the jacket extrusion process to form a reinforced jacket 114. The optical fiber cable 100 does not include a separate reinforcing layer (e.g., of aramid yarn, glass rods, etc.) between the buffer 104 and the reinforced jacket 114.

Manufacturing of the optical fiber cable 100 includes wrapping a sheet of reinforcing tape 106 around the first optical fiber 102 so that longitudinal edges 109, 111 of the sheet extend parallel to each other along a length of the first optical fiber 102 to form a rolled sheet of reinforcing tape 106; and extruding a jacket 108 around the rolled sheet of reinforcing tape 106 so that heat from extrusion partially melts the reinforcing tape 106 to heat-bond the rolled sheet of reinforcing tape 106 to the jacket 108. The reinforcing tape 106 includes polyethylene molecules uni-directionally oriented along the length of the sheet.

In some implementations, wrapping the sheet of reinforcing tape 106 includes wrapping the sheet so that the longitudinal edges 109, 111 are circumferentially spaced from each other to form a longitudinal slit 110. In certain implementations, wrapping the sheet of reinforcing tape 106 includes wrapping a first sheet of reinforcing tape around a circumferential portion of the first optical fiber; and wrapping a second sheet of reinforcing tape around another circumferential portion of the first optical fiber. The sheets of tape are wrapped so that so that respective longitudinal edges of each sheet extend parallel to each other along the length of the first optical fiber. In certain implementations, one of the longitudinal edges of the first sheet faces but is circumferentially spaced from one of the longitudinal edges of the second sheet. Another of the longitudinal edges of the first sheet faces but is circumferentially spaced from another of the longitudinal edges of the second sheet to form the rolled sheet with two longitudinal slits extending along a length of the rolled sheet.

In some implementations, the sheet of reinforcing tape 106 can be used in the type of cable disclosed in U.S. application Ser. No. 13/371,899, filed Feb. 13, 2012, the disclosure of which is hereby incorporated herein by reference. In certain implementations, the sheet of reinforcing tape 106 can be used as a replacement for the tape with reinforcing fibers. For example, the sheet of reinforcing tape 106 can be thermally bonded to the jacket instead of adhesively bonded to the jacket in the '899 application.

Figure 5:
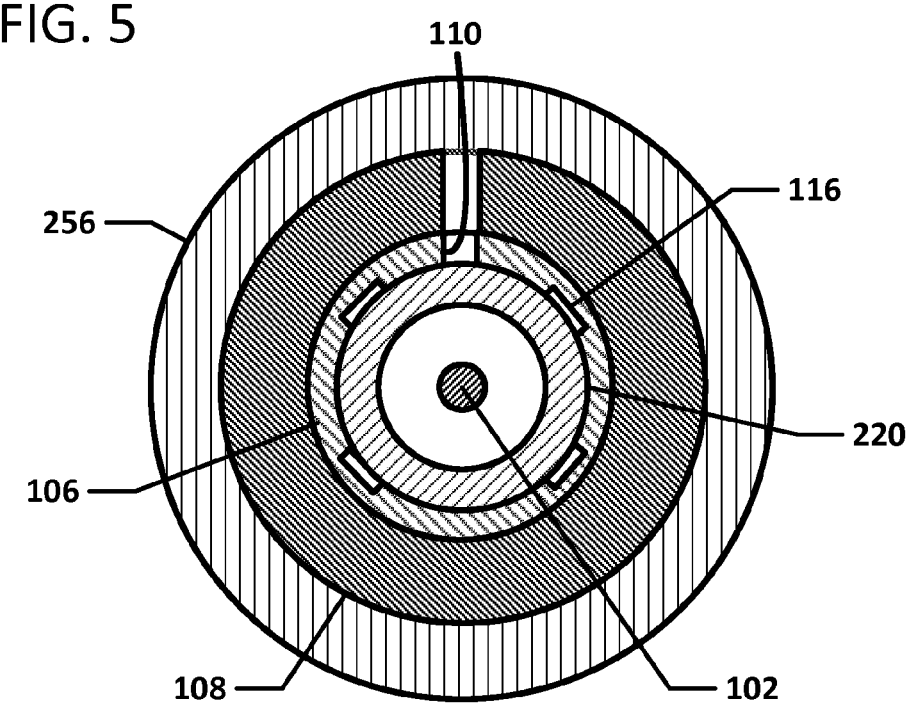
FIG. 5 is a transverse cross-sectional view taken along the 5-5 line of FIG. 4.
Figure 4:
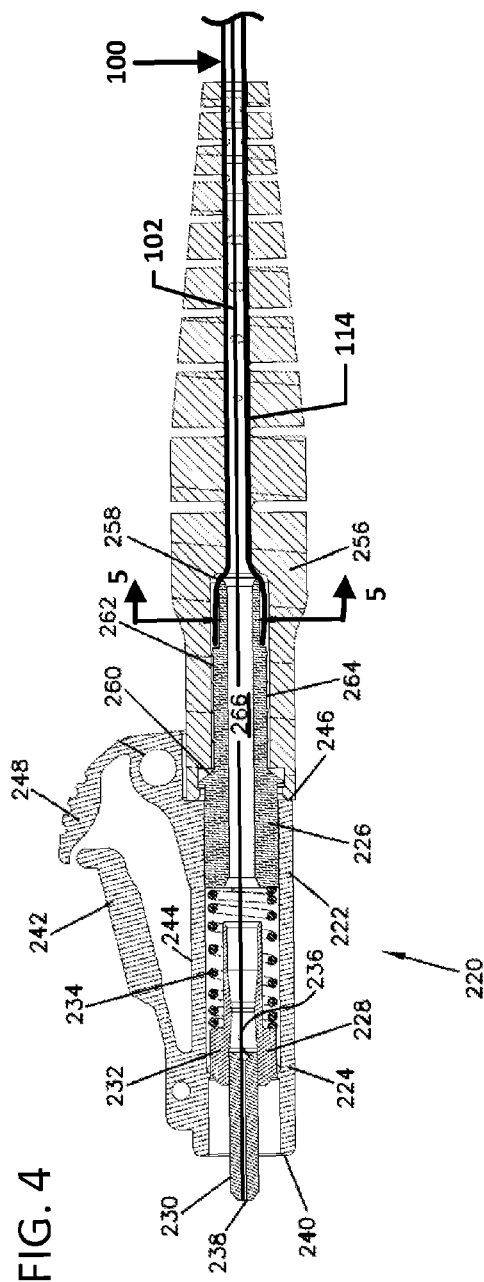
FIG. 4 is a longitudinal cross-sectional view of an example fiber optic connector terminating an end of an optical fiber and having a reinforcing jacket thermally bonded to a rear portion of the fiber optic connector.
Figure 6:
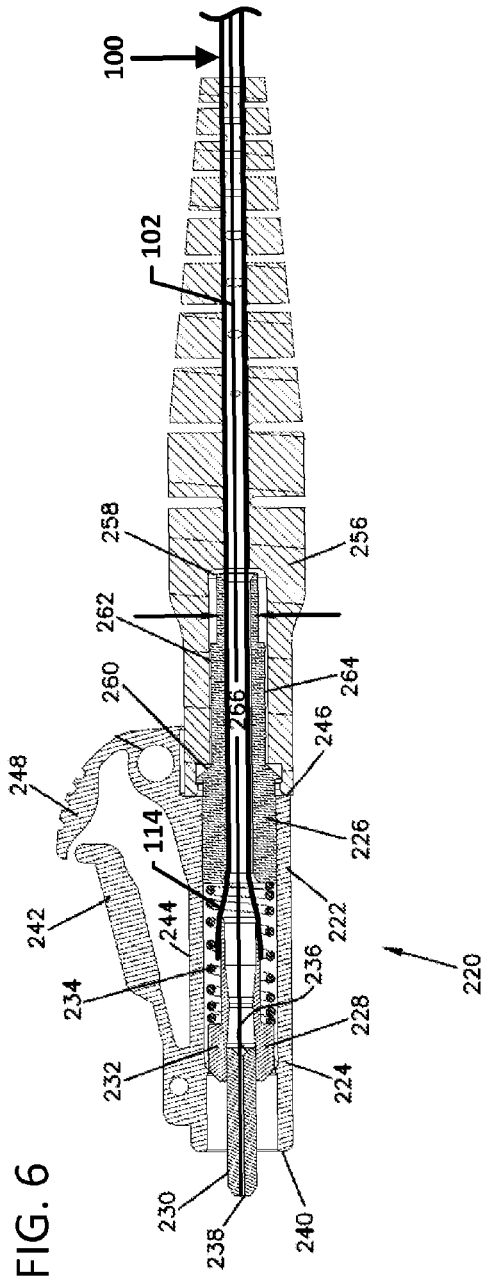
FIG. 6 is a longitudinal cross-sectional view of an example fiber optic connector terminating an end of an optical fiber and having a reinforcing jacket thermally bonded to a ferrule hub of the fiber optic connector.

As shown in FIGS. 4-6, the optical fiber cable 100 can be terminated at an optical connector 220. In the example shown in FIGS. 4 and 6, the optical connector 220 is in the form of a conventional LC connector. In other implementations, however, other types of optical connectors (e.g., SC connectors, ST connectors, MPO connectors, LX.5 connectors, FC connectors, etc.) can terminated the optical fiber cable 100. In general, the reinforced jacket 114 is at least partially separated from the buffer fiber. The fiber 102 is routed through the connector 220 to the ferrule 230. The reinforced jacket 114 is secured to a housing 222 of the connector 220 as will be disclosed in more detail herein.

The connector housing 222 has a distal housing portion 224 and a proximal housing portion 226. The optical connector 220 also includes a ferrule assembly 228 having by a ferrule 230, a hub 232, and a spring 234. A proximal end 236 of the ferrule 230 is secured within the ferrule hub 232. When the optical connector 220 is assembled, the ferrule hub 232 and the spring 234 are captured between the distal housing portion 224 and the proximal housing portion 226 of the connector housing 222 and a distal end 238 of the ferrule 230 projects distally outwardly beyond a distal end 240 of the connector housing 222. The spring 234 is configured to bias the ferrule 230 in a distal direction relative to the connector housing 222.

According to certain embodiments, the distal housing portion 224 may be formed from a molded plastic. The distal housing portion 224 defines a latch 242 extending from a top wall 244 of the distal housing portion 224 toward the proximal end 246, the latch 242 extending at an acute angle with respect to the top wall 244 of the distal housing portion 224. The distal housing portion 224 also includes a latch trigger 248 that extends from the proximal end 246 of the distal housing portion 224 toward the distal end 240. The latch trigger 248 also extends at an acute angle with respect to the top wall 244. The latch trigger 248 is configured to come into contact with the latch 242 for flexibly moving the latch 242 downwardly.

A strain relief boot 256 is mounted over a proximal end 258 of the proximal housing portion 226 and snapped over a boot flange 260 to retain the boot 256 with respect to the connector housing 222. The proximal end 258 of the proximal housing portion 226 defines a crimp region 262 for crimping a fiber optic cable's strength layer to the proximal housing portion 226, normally with the use of a crimp sleeve (not shown). The exterior surface 264 of the proximal housing portion 226 defining the crimp region 262 can be textured (e.g., knurled, ridged, provided with small projections, etc.) to assist in retaining the crimp on the housing 222.

The reinforced jacket 114 can be partially separated from the buffered fiber at the end so that the reinforced jacket 114 can be mounted to the connector 220 and the fiber 102 can be routed through the connector 220 to the ferrule 230. In some implementations, the jacket portion 108 of the reinforced jacket 114 is cut or slit to provide access to the slit 110 defined in the tape 106. In certain implementations, a first axial end of the jacket 108 has a longitudinal slit that is disposed in alignment with the longitudinal slit 110 between the longitudinal edges 109, 111 of the rolled sheet 106 to facilitate mounting of the first axial end of the rolled sheet 106. The reinforced jacket 114 can be spread open (e.g., using a spreader tool) along the slit in the jacket portion 108 and the slit 110 in the tape 106. In other implementations, the jacket 108 can be stripped from the first axial end of the rolled sheet of reinforcing tape 106 to access the slit 110 if the jacket 108 is not thoroughly bonded to the tape 106.

In other implementations, the first axial end of the reinforced jacket 114 defines a second longitudinal slit at a position circumferentially spaced from the longitudinal slit 110. In certain implementations, part of the slit is formed as a gap between longitudinal edges of the tape 106 and part of the slit cut into the jacket portion 108 either before or after bonding the jacket 108 to the tape 106. In other implementations, the reinforced jacket 114 can be cut at two or more circumferential locations to form two or more slits 110, 110' (e.g., see FIG. 7) so that the reinforced jacket 114 can be peeled away from the buffered fiber.

As shown in FIG. 4, in some implementations, the stripped or spread apart end of the reinforced jacket 114 is mounted over a rear portion of the boot flange 260. In such implementations, the optical fiber 102 moves relative to the reinforced jacket 114 when the ferrule 230 is moved axially. In some implementations, the reinforced jacket 114 is thermally bonded to the connector 220. For example, the reinforced jacket 114 may be secured to the boot flange 260 by one or more heat stakes 116 (see FIG. 5). The boot 256 snaps over the boot flange 260. In certain implementations, the boot 256 aids in holding the reinforced jacket 114 to the connector 220 (e.g., through radial pressure, through axial friction, etc.).

In other implementations, the stripped or spread apart end of the reinforced jacket 114 is routed through the proximal housing portion 226 and over a rear portion of the ferrule assembly hub 232 (see FIG. 6). In such implementations, the reinforced jacket 114 moves with the optical fiber 102 when the ferrule 230 moves axially. The reinforced jacket 114 can be thermally bonded (e.g., heat staked) to the hub 232. In other implementations, the reinforced jacket 114 can be crimped, friction-fit, or otherwise secured to the hub 232.

In some implementations, the tape 106 having longitudinally oriented polymer molecules provides greater tenacity than aramid yarn. For example, in certain implementations, the pull-out force required to disengage the optical connector 220 from the fiber optic cable 100 after thermally bonding the reinforced jacket 114 to the connector 220 would be at least about 26 lbs. In certain implementations, the connectorized optical fiber cable 100 has a tensile-load strength of at least 250 Newtons. In certain implementations, the connectorized optical fiber cable 100 has a tensile-load strength of at least 280 Newtons. In certain implementations, the connectorized optical fiber cable 100 has a tensile-load strength ranging between about 270 Newtons and 310 Newtons. In certain implementations, the connectorized optical fiber cable 100 has a tensile-load strength ranging between about 280 Newtons and 300 Newtons.

A process of connectorizing a first axial end of an optical cable includes spreading out reinforcing tape at the first axial end of the optical cable to provide an enlarged cross-dimension of the first axial end; axially sliding a portion of an optical connector rearwardly into the first axial end of the optical cable through the enlarged cross-dimension; and applying heat to the first axial end of the optical cable to heat-bond the first axial end of the optical cable to the portion of the optical connector. In certain implementations, the cable includes a jacket surrounding reinforcing tape that is wrapped around an optical fiber of the cable.

In some implementations, the connectorization process also includes stripping a portion of the jacket from the first axial end of the optical cable before spreading out the reinforcing tape. In other implementations, the connectorization process also includes cutting the jacket at the first axial end of the optical cable to form a slit; wherein spreading out the reinforcing tape also comprises spreading out the jacket at the slit. In certain implementations, cutting the jacket and the reinforcing tape at the first axial end of the optical cable at a location circumferentially spaced from the slit to form a second slit. Spreading out the reinforcing tape also can include spreading out the jacket at the slit and the second slit. In certain implementations, the second slit is located opposite the slit.

In certain implementations, spreading out reinforcing tape at the first axial end of the optical cable includes inserting a spread tool into a longitudinal slit defined in the reinforcing tape at the first axial end of the cable; and sliding the spreader tool along the longitudinal slit.

In some implementations, the reinforcing tape is heat-bonded to a rear housing portion of a connector body. For example, the connectorization process may include threading the optical cable through a boot; sliding the boot over the first axial end of the optical cable and over the rear housing portion of the optical connector; and securing the boot to the optical connector so that the boot encloses the first axial end of the optical cable.

In other implementations, the reinforcing tape is heat-bonded to a ferrule hub of a connector body. For example, the connectorization process may include threading the optical cable through an inner connector body, an outer connector body, and a boot; sliding the ferrule hub through the outer connector body from a rear of the outer connector body after the optical cable is heat-bonded to the ferrule hub; sliding the inner connector body partially into the outer connector body from the rear of the outer connector body; and mounting the boot to the optical connector.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of manufacturing an optical fiber cable having at least a first optical fiber, the method comprising:
   wrapping a sheet of reinforcing tape around the first optical fiber so that longitudinal edges of the sheet extend parallel to each other along a length of the first optical fiber to form a rolled sheet of reinforcing tape, the tape not including reinforcing yarns or fibers; and
   extruding a jacket around the rolled sheet of reinforcing tape so that heat from extrusion partially melts the reinforcing tape to heat-bond the rolled sheet of reinforcing tape to the jacket.

2. The method of claim 1, wherein the reinforcing tape including polyethylene molecules uni-directionally oriented along the length of the sheet.

3. The method of claim 1, wherein wrapping the sheet of reinforcing tape comprises wrapping the sheet so that the longitudinal edges are circumferentially spaced from each other to form a longitudinal slit.

4. The method of claim 1, wherein wrapping the sheet of reinforcing tape comprises:
   wrapping a first sheet of reinforcing tape around a circumferential portion of the first optical fiber so that longitudinal edges of the first sheet extend parallel to each other along the length of the first optical fiber; and
   wrapping a second sheet of reinforcing tape around another circumferential portion of the first optical fiber so that longitudinal edges of the second sheet extend parallel to each other along the length of the first optical fiber.

5. The method of claim 4, wherein one of the longitudinal edges of the first sheet faces but is circumferentially spaced from one of the longitudinal edges of the second sheet; and wherein another of the longitudinal edges of the first sheet faces but is circumferentially spaced from another of the longitudinal edges of the second sheet to form the rolled sheet with two longitudinal slits extending along a length of the rolled sheet.

6. A method of connectorizing a first axial end of an optical cable including a jacket surrounding reinforcing tape wrapped around an optical fiber, the method comprising:
   spreading out reinforcing tape at the first axial end of the optical cable to provide an enlarged cross-dimension of the first axial end, the tape not including reinforcing yarns or fibers;
   axially sliding a portion of an optical connector rearwardly into the first axial end of the optical cable through the enlarged cross-dimension; and
   applying heat to the first axial end of the optical cable to heat-bond the first axial end of the optical cable to the portion of the optical connector.

7. The method of claim 6, further comprising stripping a portion of the jacket from the first axial end of the optical cable before spreading out the reinforcing tape.

8. The method of claim 6, further comprising cutting the jacket at the first axial end of the optical cable to form a slit; wherein spreading out the reinforcing tape also comprises spreading out the jacket at the slit.

9. The method of claim 8, further comprising cutting the jacket and the reinforcing tape at the first axial end of the optical cable at a location circumferentially spaced from the slit to form a second slit; wherein spreading out the reinforcing tape also comprises spreading out the jacket at the slit and the second slit.

10. The method of claim 9, wherein the second slit is located opposite the slit.

11. The method of claim 6, wherein spreading out reinforcing tape at the first axial end of the optical cable comprises inserting a spread tool into a longitudinal slit defined in the reinforcing tape at the first axial end of the cable; and sliding the spreader tool along the longitudinal slit.

12. The method of claim 6, wherein the portion of the optical connector includes a rear housing portion of a connector body.

13. The method of claim 12, further comprising:
   threading the optical cable through a boot;
   sliding the boot over the first axial end of the optical cable and over the rear housing portion of the optical connector; and
   securing the boot to the optical connector so that the boot encloses the first axial end of the optical cable.

14. The method of claim 6, wherein the portion of the optical connector includes a ferrule hub.

15. The method of claim 14, further comprising:
   threading the optical cable through an inner connector body, an outer connector body, and a boot;
   sliding the ferrule hub through the outer connector body from a rear of the outer connector body after the optical cable is heat-bonded to the ferrule hub;
   sliding the inner connector body partially into the outer connector body from the rear of the outer connector body; and
   mounting the boot to the optical connector.

* * * * *